United States Patent

Kinjo et al.

[15] 3,641,278

[45] Feb. 8, 1972

[54] MAGNETIC DISC RECORDING AND REPRODUCING TIME INDICATOR

[72] Inventors: Hisao Kinjo; Yoshitaka Iwabuchi, both of Yokohama; Seiichi Takashima, Kamakura; Takatoshi Kato; Keigo Okano, both of Tokyo, all of Japan

[73] Assignee: Victor Company of Japan Limited, Kanagawa-ku, Yokohama, Japan

[22] Filed: May 27, 1969

[21] Appl. No.: 828,222

[30] Foreign Application Priority Data

May 29, 1968 Japan....................................43/36029

[52] U.S. Cl.............179/100.2 M, 178/6.6 DD, 340/174.1 C

[51] Int. Cl..................H04n 5/78, G11b 21/04, G11b 27/36

[58] Field of Search...................179/6 R, 100.2 CR, 100.2 T, 179/100.1 D, 100.1 DR; 274/17, 9; 340/174.1 C; 346/17; 116/124 A; 33/1 M, 1 PT; 178/6.6 A

[56] References Cited

UNITED STATES PATENTS

| | | | |
|---|---|---|---|
| 2,539,758 | 1/1951 | Silverman et al. | 340/282 |
| 2,706,118 | 4/1955 | Camras | 340/174.1 C |
| 2,787,511 | 4/1957 | Ehret | 33/1 M |
| 2,953,384 | 9/1960 | Walters | 274/17 |
| 3,419,878 | 12/1968 | Maurer | 346/17 |
| 3,426,161 | 2/1969 | Dollenmayer | 179/100.1 DR |

*Primary Examiner*—Bernard Konick
*Assistant Examiner*—Steven B. Pokotilow
*Attorney*—Holman and Stern

[57] ABSTRACT

A recording and reproducing time indicator in a magnetic recording and reproducing apparatus which makes magnetic recording and reproduction by linear movement of magnetic heads in contact with a rotary magnetic medium. The indicator comprises a time indication part having a scale showing the position of magnetic heads into time, a pointer for indicating a scale on said time indication part, and a pointer driving means for moving said pointer in response to the position of magnetic heads moved by the head moving means.

3 Claims, 10 Drawing Figures

INVENTORS
Hisao Kinjo Et Al

BY Holman, Glascock, Downing & Seebold
ATTORNEYS

INVENTORS
Hisao Kinjo Et Al

BY Holman, Glascock, Downing & Seebold
ATTORNEYS

INVENTORS

Hisao Kinjo Et Al

BY Holman, Glascock, Downing + Seebold

ATTORNEYS

INVENTORS
Hisao Kinsa Et Al

BY Holman, Glascock, Downing + Seebold
ATTORNEYS

MAGNETIC DISC RECORDING AND REPRODUCING TIME INDICATOR

BACKGROUND OF THE INVENTION

This invention relates to a recording and reproducing time indicator and more particularly to a device for indicating recording and reproducing time relative to the movement of a magnetic head in a magnetic recording and reproducing apparatus using a rotary magnetic medium.

Generally in an apparatus for recording and reproducing video signals on a rotary magnetic medium such as a magnetic sheet, a magnetic disk and a magnetic drum, the recording and reproducing time is usually short, approximately for 10 to 30 seconds at maximum. Therefore it is imperative to use a time indicator associated with the movement of the magnetic head either for indication of recording or reproducing time. Particularly, when reproducing the recorded video signals in slow motion pictures it is required that the position of the reproduced signal informations in slow motion may be indicated by time in which said signal informations are normally reproduced.

Therefore the present invention is invented in order to meet the above demands.

SUMMARY OF THE INVENTION

It is a primary object of the present invention to provide an indicator which is adapted for indicating recording and reproducing time in a magnetic recording and reproducing apparatus using a rotary magnetic medium.

Another object of the invention is to provide a recording and reproducing time indicator capable of making indication of time in response to position of magnetic head during its movement.

Another object of the invention is to provide a recording and reproducing time indicator which can electrically detect a position of movement of a magnetic head and operate a time indicating meter settled at a preferred position in a magnetic recording and reproducing apparatus.

A further object of the invention is to provide a recording and reproducing time indicator which is adapted to make a direct indication of time on the indication board having a scale converted into time in response to the movement of a magnetic head.

Still other object of the invention is to provide a recording and reproducing time indicator which can make a display by lamps corresponding to the movement of a magnetic head in the forward and reverse directions thereby facilitating the reading of a scale on the meter of the indicator.

Other objects and features of the invention will be apparent from the following description when taken in conjunction with the accompanying drawings, in which:

DETAILED DESCRIPTION OF THE INVENTION

Figure 1:
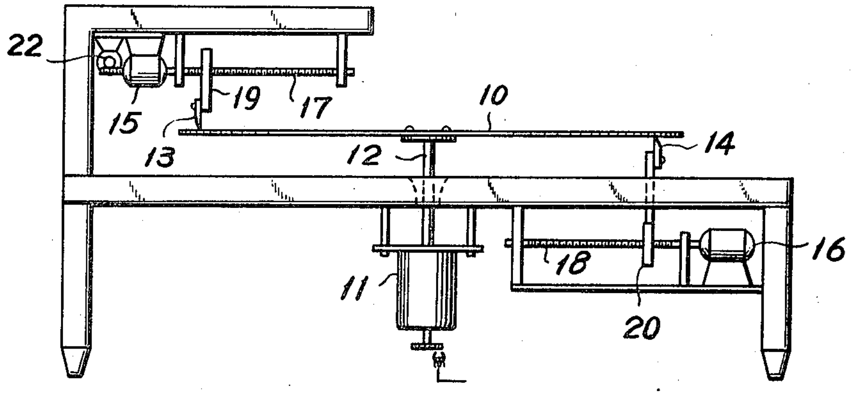
FIG. 1 is a front elevation of a rotary magnetic medium recording and reproducing apparatus employing an indicator according to the invention.

Now, in FIG. 1, a magnetic sheet 10 has magnetic surfaces on the upper and lower sides and is fixed to a shaft 12 of a driving motor 11 rotating in synchronization with vertical synchronizing signals of a television video signals. On both upper and lower surfaces of the magnetic sheet 10 are recorded and reproduced video signals by means of magnetic heads 13 and 14 which are disposed diametrically in opposition on both sides of the central shaft 12. The magnetic heads 13 and 14 are respectively supported by head supports 19 and 20 having respectively half nuts fitted to feed screws 17 and 18 directly connected to rotary shafts of pulse motors 15 and 16.

According to this embodiment of the present invention, the rotary angle of a single step of the intermittent rotation of the pulse motor 15 and 16 (angle in which a rotary shaft rotates relative to one input pulse) is determined at 15° and the device is arranged such that the magnetic heads 13 and 14 are moved in two track pitches on the magnetic sheet 10 in an angle of 60° corresponding to four steps of the pulse motor. Accordingly, the magnetic heads are respectively moved in two track pitches by four pulses and in one track pitch by two pulses.

Figure 2:
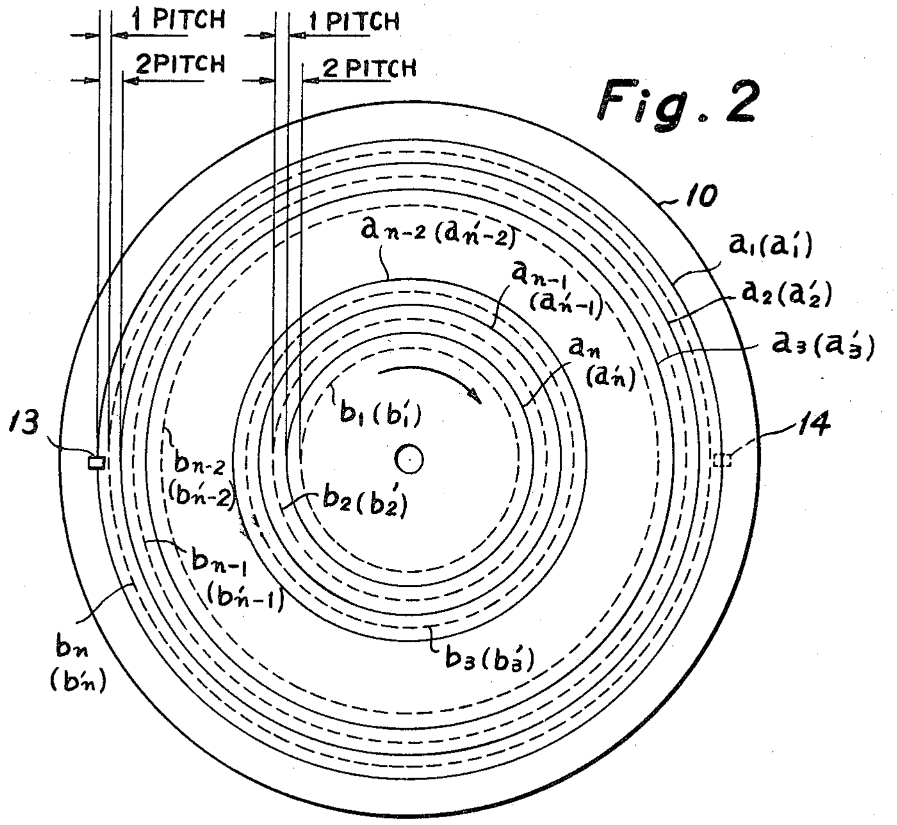
FIG. 2 is a plan view of a magnetic sheet showing a track pattern.

The magnetic head 13 records one field or frame of the video signal on a track $a_1$ shown in FIG. 2 during one rotation of the magnetic sheet 10, following which the magnetic head 14 makes recording on a track $a_1'$ on the lower surface of the magnetic sheet 10. During the recording of the magnetic head 14 the pulse motor 15 rotates in 60° and the magnetic head 13 steps forward in the radial direction in two track pitches toward the inner periphery of the magnetic sheet. In the present embodiment one track pitch is determined at 130$\mu$. Following to the recording of the magnetic head 14 the magnetic head 13 makes recording on a track $a_2$ and the magnetic head 14 steps forward in two track pitches. In this manner, the magnetic heads 13 and 14 step forward alternately and intermittently and, when reaching to tracks $a_n$ and $a_n'$, said heads step one more track pitch and reach to tracks $b_1$ and $b_1'$ on the innermost end.

The magnetic heads 13 and 14 after reaching the tracks $b_1$ and $b_1'$ are reversed in the direction and intermittently step forward in every two track pitches. Therefore, every reverse track $b_1$ $(b_1')$ – $b_n(b_n')$ of the magnetic head is formed between forward and reverse tracks $a_1$ $(a_1')$ – $a_n$ $(a_n')$, the forward and the reverse tracks thus being mutually in alternate arrangement on the magnetic sheet. The magnetic heads 13 and 14 further step forward by one track pitch and reach the tracks $a_1$ and $a_1'$ on the outermost peripheral end of the magnetic sheet. Reaching to the tracks $a_1$ and $a_1'$ the magnetic heads 13 and 14 erase the recorded signal and record a new video signal, stepping forward intermittently, until said heads reach a point as determined. The mode of operation as described applies also to the reproducing operation.

Figure 3:
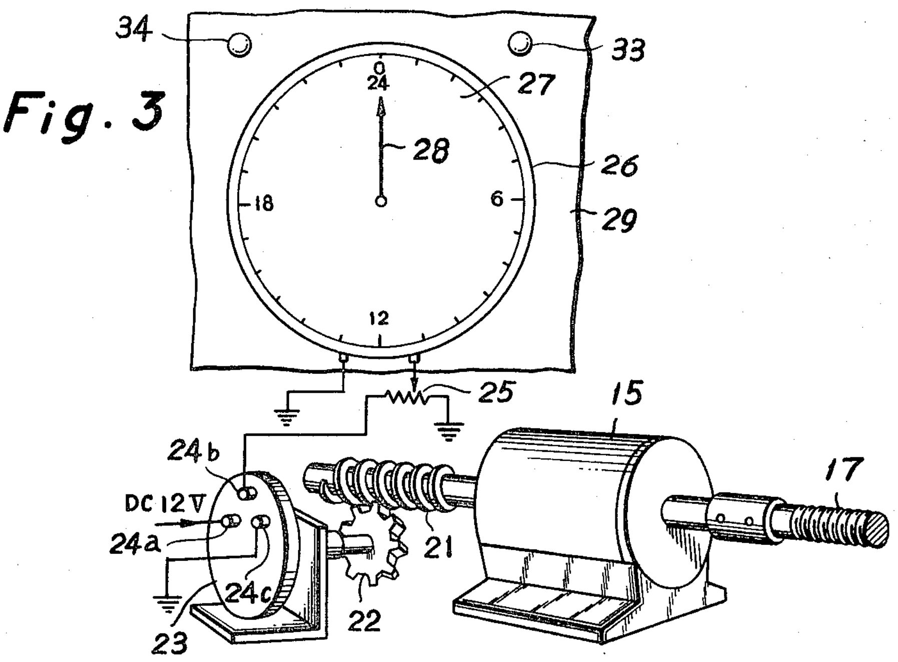
FIG. 3 is a perspective view of a first embodiment of the indicator according to the invention.

FIG. 3 is a first embodiment of the indicator according to the present invention which is applied in the magnetic recording and reproducing device as heretofore described. In the figure, worm 21 is provided at a rear end of a rotary shaft of the pulse motor 15 opposite to a feed screw 17, while worm gear 22 is provided in mesh with the worm 21 to rotate with the rotation of the pulse motor 15. Variable resistor 23 is a B-type volume. The resistance of said variable resistor 23 varies linearly corresponding to the rotary angle of the worm gear 22 provided on the rotary shaft of the resistor 23. A terminal 24$a$ of the variable resistor 23 is connected to a direct current 12 V and a terminal 24$b$ from a sliding element is connected to a half-fixed variable resistor 25 for adjusting a swinging range of a pointer of the indicator while a terminal 24$c$ is grounded. The ratio of the number of teeth of the worm 21 and that of the worm gear 22 may be preferably determined so that the sliding member may move along a full variable range of the variable resistor 25 for the rotation of the rotary shaft of the worm 21 corresponding to the full length of movement of the magnetic head.

A voltage corresponding to the number of revolutions (the angle of revolutions) of the worm 21 or to the position of movement of the magnetic head 13 is taken from the terminal 24*b* and supplied to an indicating meter 26 on a board 29 through the resistor 25. The meter 26 consists of a volt-meter and scale 27 shows the value of voltage variation converted into time. The dial of the scale 27 has figures showing the time ranging from 0 to 24 seconds impressed on the periphery of the dial at equal intervals. The variable resistor 25 is provided such that a pointer 28 of the indicator 26 may rotate just one round corresponding to the variation of the voltage taken from the variable resistor 23.

Indication of time will therefore be made by the pointer 28 of meter 26 corresponding to the voltage of the variable resistor 23 attained in accordance with rotation of the pulse motor 15 or with position of movement of the magnetic head 13. In the forward movement of the magnetic head 13 from the outer to inner track of the magnetic sheet 10 the pointer 28 will rotate on the dial 27 from the position of 0 second to that of 24 seconds in the clockwise direction and in the reverse movement of the head 13 from the inner to outer track of the magnetic sheet 10, the pointer 28 will rotate in the counterclockwise direction and returns to the point of 0 second as designated on the dial.

Figures 4, 6:
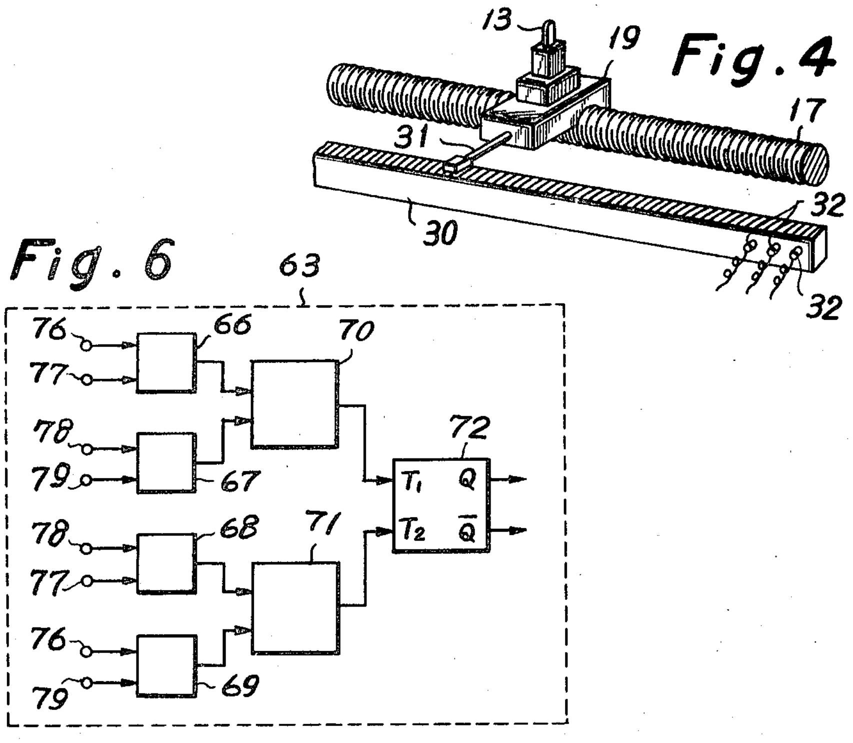
FIG. 4 is a perspective view showing an essential part of a second embodiment of the indicator according to the invention.
FIG. 6 is a block diagram showing another essential part of the indicator according to the invention.

In place of the variable resistor 23 provided with the worm gear 22 such means as shown in FIG. 4 may be used for the means to obtain a voltage variation corresponding to the rotation of the pulse motor 15. Sliding resistor 30 is provided straight in parallel with the feed screw 17 and sliding member 31 on the head support 19 slides in contact with the sliding resistor 30 by movement of the magnetic head.

A voltage corresponding to the position of movement of the magnetic head 13 is therefore led from a terminal 32 in association with the moving of the head.

When the movement of the magnetic head is stopped and only the same track is reproduced as in the still motion reproduction or when the periodic cycle of movement of the magnetic head is decreased such as reproducing each track in plural times as in the slow motion reproduction, it is hard to know whether the magnetic head is in the forward or in the reverse movement since the pointer 28 is stopped or its movement is extremely slow. Thus, in the device of the present invention it is provided that lamps 33 and 34 are arranged on the indication board 29 as shown in FIG. 3 so as to recognize whether the magnetic head is in the forward movement or in the reverse movement by lighting the lamp 33 or the lamp 34.

Figure 5:
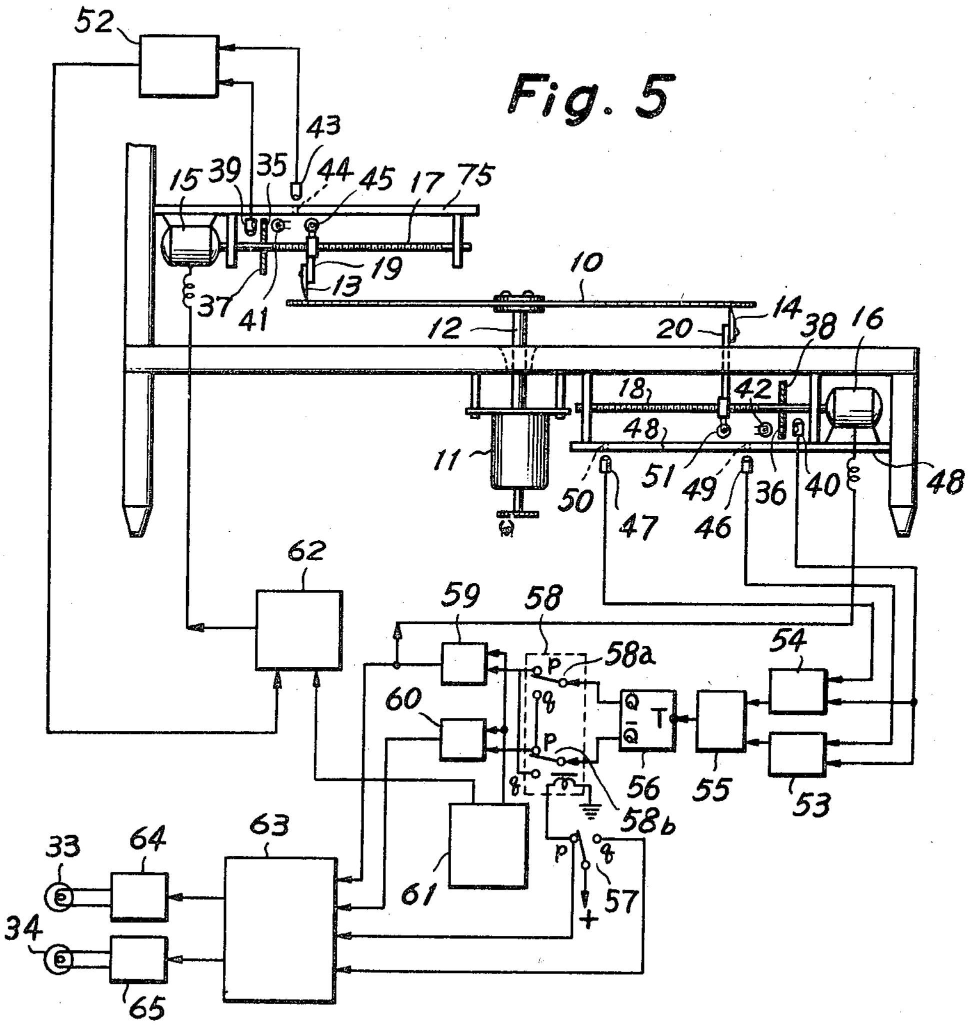
FIG. 5 is a diagrammatic view of an embodiment of a means for indicating the reciprocal movement of the magnetic head.

A circuit diagram for lighting the lamp 33 and 34 will now be explained with reference to FIGS. 5 to 7. Rotary disks 37 and 38 having small apertures 35 and 36 are respectively secured to the rotary shaft of the pulse motors 15 and 16 which revolve with the rotation of said rotary shaft and the feed screws 17 and 18. For the detection of the position of rotation of rotary disks there are provided photo transistors 39 and 40 disposed in opposition to light source lamps 41 and 42 carrying the rotary disks 37 and 38 therebetween. The photo transistors 39 and 40 generate detection signals when the small apertures 35 and 36 of the rotary disks 37 and 38 come in rotation on a line connecting each of said transistors to the lamps 41 and 42.

Phototransistor 43 serves for the detection of the starting position of forward and reverse movement of the magnetic head 13. Opposite to the phototransistor 43 is provided an aperture 44 on support 75 supporting the pulse motor 15. When the support 19 comes to the aperture 44, the transistor 43 receives the light of a lamp 45 on support 19 and generates the detection signal. Phototransistors 46 and 47 are respectively used for detection of the starting position of the stepping movement of head 14 and for detection of the reversing position of head 14 and disposed in opposition to apertures 49 and 50 on a support 48. The phototransistors 46 and 47, when the head support 20 reaches a position opposite to the apertures 49 and 50, respectively receive the light of lamp 51 on the support 20 and generate signals. The signal of the photo transistor 43 is gated with the signal of the phototransistor 39 in AND-circuit 52. The signals of the phototransistors 46 and 47 are gated with the signal of the phototransistor 40 in AND-circuits 53 and 54. In OR-circuit 55 are gated the signals from the circuits 53 and 54 with each other and are obtained the turnover signals on the inner and outer end tracks. The output signal of the OR-circuit 55 is sent to an input terminal T of bistable multivibrator 56 and output terminals Q and $\overline{Q}$ of said vibrator 56 are respectively set and reset. The output signals from said output terminals Q and $\overline{Q}$ are used for control signals.

When a control mode switch 57 is connected to a terminal *p* on the forwarding side of the magnetic head, a switch circuit 58 is actuated and switches 58*a* and 58*b* are connected to the terminal *p* respectively. Consequently, the output terminal Q of vibrator 56 and the gate circuit 59, and the output terminal $\overline{Q}$ and the gate circuit 60 are respectively connected. The gate circuits 59 and 60 are simultaneously applied the output of a motor driving pulse generating circuit 61 and performs gatings. The output of the gate circuit 59 revolves the pulse motor 16 normally and the output of the gate circuit 60 causes it to revolve inversely. Gate circuit 62 also performs gating the output of the AND-circuit 52 with the output of the pulse generating circuit 61.

When the magnetic head is switched to a reverse mode during its forward movement along a forward track by a forward mode, the motor revolves reversely and the magnetic head again comes back to the starting position of its forward movement, the track which has been reproduced during its reverse movement being a forward track. In the similar way, when the magnetic head is reverse moded during its stepping on the reverse track in a forward mode and then reversed, a reverse track is reproduced. Therefore, in the forward and reverse signal generating circuit 63, the forward mode signals from the gate circuits 59 and 60 and the terminal *p* of switch 57, or the reverse mode signal from the terminal *q* are supplied, there generating a forward or reverse signal. Said forward signal is amplified by amplifier 64 and thereafter lights the lamp 33 and said reverse signal is amplified by amplifier 65 and lights the lamp 34.

Particulars of the forward and reverse signal generating circuit 63 are illustrated in FIG. 6. It will be seen that the AND-circuit 66 is supplied the forward signal and the normal pulse respectively from terminals 76 and 77; AND-circuit 67 is supplied the reverse signal and the reverse pulse respectively from terminals 78 and 79; AND-circuit 68 is supplied the reverse signal and the normal pulse respectively from the terminals 78 and 77; and the AND-circuit 69 supplied the forward signal and the reverse pulse respectively from the terminals 76 and 79. Two forward signals obtained from the AND-circuits 66 and 67 and the two reverse signals obtained from the AND-circuits 68 and 69 are respectively combined into one signal respectively in OR-circuits 70, 71 and supplied to the bistable multivibrator 72. While the forward signal is being supplied to the input terminal $T_1$ of the multivibrator 72 from the AND-circuit 70, the output terminal Q of the multivibrator 72 is in ON state and the output terminal $\overline{Q}$ is in OFF state, and the lamp 33 is lighted. Similarly, when the reverse signal from the AND-circuit 71 is supplied to the input terminal $T_2$ of the multivibrator 72, its output terminal Q is in OFF state, the output terminal $\overline{Q}$ ON state, and the lamp 34 is lighted.

Figure 7:
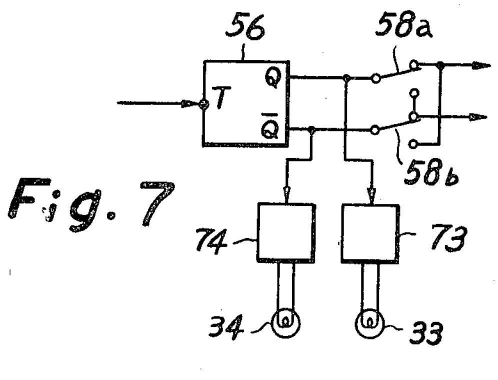
FIG. 7 is a block diagram showing another embodiment of a means for indicating the reciprocal movement of the magnetic head.

FIG. 7 is a block diagram of other embodiment of a lighting means for the indication lamp as described. In the input terminal T of the T-type bistable multivibrator 56 similar to FIG. 1 is supplied the reverse pulse. The output signal from the output terminals Q and $\overline{Q}$ are respectively amplified by lamp-driving amplifiers 73 and 74 and actuates the indicating lamps 33 and 34. When the magnetic head steps forward along the forward track and then reaching the innermost track and the reverse pulse is detected, the output terminal Q of the multivibrator 56 is OFF, the output terminal $\overline{Q}$ ON, and the lamp 34 is lighted. When the magnetic head steps forward along the reverse track then reaching the outermost track and the reverse pulse is detected, the output terminal Q of multivibrator 56 is ON, the output terminal $\overline{Q}$ OFF, and the lamp 33 is lighted. Although the control mode of the head movement driving motor is switched in the way of the forward movement of the magnetic head, the indication lamps will not replaced one by another so far as the reverse pulse is not detected.

As hereinbefore described, in the embodiment shown, where the indicator is operated by a voltage corresponding to the position of movement of the magnetic head, it is available to dispose the meter 26 at a desired position easy for operation by preferably selecting the length of a connection wire so as to electrically obtain a position of the magnetic head and to arrange a remote control means desirably at a separate position from the recording and reproducing apparatus. For the meter 26 there may be used in its place a voltmeter as well as amperemeter and ohmmeter.

An embodiment of the device for indicating the position of a magnetic head directly on the indication board will now be explained.

Figure 8:
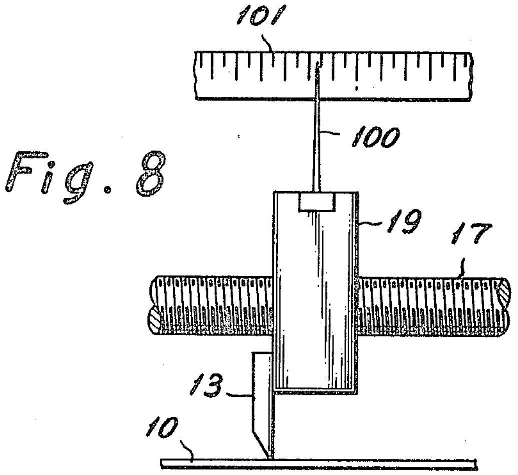

FIG. 8 shows a third embodiment of the device according to this invention. Herein is shown a pointer 100 provided on the upper part of the head support 19 which makes an indication on a time indication board 101 of the linear-type disposed in parallel with the feed screw 17. On the indication board 101 is provided a scale having figures impressed at equal intervals and showing a time converted from the position of the magnetic head. According to this embodiment, the pointer 100 may have a simple construction available of an accurate time indication as it fully meets the movement of the magnetic head 13.

Figure 9:
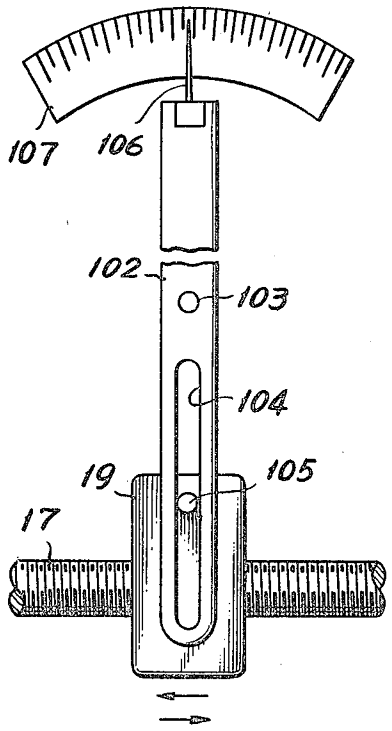
FIGS. 8 to 10 are respectively front elevations of third to fifth embodiments of the indicator according to the invention.

FIG. 9 is a fourth embodiment of the device according to this invention. Lever 102 can rotate around a stationary shaft 103, and a long groove 104 at an end of which being engaged with a pin 105 on the head support 19. With the movement of the head support 19 by rotation of the feed screw 17, the lever 102 rotates about the shaft 103 and a pointer 106 on the other end of the lever 102 rotates on the circular indication board 107 to provide a time indication.

Figure 10:
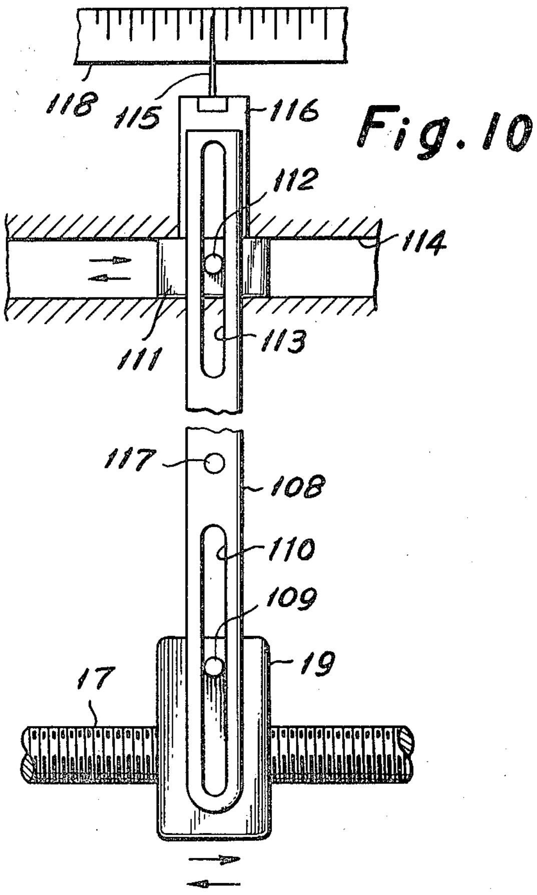

FIG. 10 shows a fifth embodiment of the device of the present invention. Lever 108 has a long groove 110 in engagement with a pin 109 secured to the head support 19 at an end thereof and a long groove 113 engaged with a pin 112 on a slider 111 on the other end. The slider 111 is guided by grooves 114 and slides on a line. There is a pointer support 116 integrally formed with the slider 111 and having a pointer 115 at its end. As the feed screw 17 rotates and the head support 19 moves with rotation of the feed screw, the lever 108 rotates about shaft 117, following which the slider 111 and the pointer support 116 slide and the pointer slides along an indication board 118 of the linear type to make an indication.

In the embodiments 4 and 5, the amount of indication may be suitably increased or decreased by selecting the length of levers 102 and 108, position of rotary shaft 103 and 117 and other requirements as preferred.

While the invention has been described with respect to specific embodiments, various modifications and variations thereof will be apparent to those skilled in the art without departing from the inventive concept, the scope of which is set forth in the appended claims.

What we claimed is:

1. A recording and reproducing time indicator comprising at least one magnetic head for recording and reproducing signals on a rotary magnetic medium, means for linearly driving and moving said magnetic head in forward and reverse directions and in different tracks in response to the moving direction, a variable resistor having a sliding element movable in response to the position of said magnetic head moved by said magnetic head driving and moving means, an indicator in which a pointer rotated in response to the variation of voltage taken from the variation of resistance of the variable resistor indicates on a scale having a time scale, and means for detecting and indicating whether the magnetic head is on the forward or reverse direction tracks.

2. The recording and reproducing time indicator as claimed in claim 1 wherein said indicator is so constructed that a range of one rotation of said pointer corresponds to an all moving range of said magnetic head and said pointer rotates in forward or reverse direction in response to the moving direction of the magnetic head.

3. The recording and reproducing time indicator as claimed in claim 1 in which the detecting and indicating means includes means for detecting the reverse movement of said magnetic head, said detecting means being provided at the ends of the moving range of the magnetic head, and two indicating lamps which are switched over their lightings by the detected output of said detecting means.

* * * * *